United States Patent [19]

Thibault

[11] Patent Number: 5,486,429
[45] Date of Patent: Jan. 23, 1996

[54] DIFFUSION VENT FOR A RECHARGEABLE METAL-AIR CELL

[75] Inventor: William C. Thibault, Powder Springs, Ga.

[73] Assignee: AER Energy Resources, Inc., Smyrna, Ga.

[21] Appl. No.: 428,005

[22] Filed: Apr. 24, 1995

[51] Int. Cl.$^6$ ............................. H01M 2/12; H01M 12/06
[52] U.S. Cl. .................... 429/27; 429/72; 429/89; 429/86
[58] Field of Search ............................ 429/27.4, 53, 54, 429/55, 57, 72, 82, 89, 86; 220/89.1, 367.1, 203.1, 203.11, 203.13

[56] References Cited

U.S. PATENT DOCUMENTS

| | | | |
|---|---|---|---|
| 3,537,903 | 11/1970 | Braun | 136/178 |
| 3,744,516 | 7/1973 | Rowe | 137/587 |
| 3,884,722 | 5/1975 | Tucholski | 136/102 |
| 3,935,030 | 1/1976 | Sperandio | 136/170 |
| 3,975,210 | 8/1976 | Warnock | 136/86 |
| 4,052,534 | 10/1977 | Devitt | 429/86 |
| 4,262,062 | 4/1981 | Zatsky | 429/27 |
| 4,298,662 | 11/1981 | Sugalski et al. | 429/50 |
| 4,484,691 | 11/1984 | Lees | 220/89 |
| 4,503,132 | 3/1985 | Struthers | 429/40 |
| 4,539,268 | 9/1985 | Rowlette | 429/54 |
| 4,556,612 | 12/1985 | Thibault et al. | 429/54 |
| 4,581,304 | 4/1986 | Beatty et al. | 429/56 |
| 4,584,248 | 4/1986 | Iwata | 429/54 |
| 4,610,370 | 9/1986 | Patterson et al. | 220/207 |
| 4,636,446 | 1/1987 | Lee | 429/54 |
| 4,640,874 | 2/1987 | Kelm | 429/27 |
| 4,684,589 | 8/1987 | Van Dyke, Jr. | 429/184 |
| 4,687,714 | 8/1987 | Oltman | 429/27 |
| 4,714,662 | 12/1987 | Bennett | 429/27 |
| 4,745,039 | 5/1988 | Yoshinaka | 429/54 |
| 4,756,982 | 7/1988 | McCartney, Jr. et al. | 429/54 |
| 4,780,378 | 10/1988 | McCartney, Jr. et al. | 429/54 |
| 4,925,744 | 5/1990 | Nikasa et al. | 429/27 |
| 5,042,675 | 8/1991 | Patterson | 220/89 |
| 5,206,097 | 4/1993 | Burns et al. | 429/90 |
| 5,258,243 | 11/1993 | Cannone | 429/55 |
| 5,328,777 | 7/1994 | Bentz et al. | 429/48 |
| 5,328,778 | 7/1994 | Woodruff et al. | 429/27 |
| 5,362,577 | 11/1994 | Pedicini | 429/27 |

FOREIGN PATENT DOCUMENTS

| | | |
|---|---|---|
| 1064629 | 5/1954 | France . |
| 2345473 | 9/1973 | Germany . |

OTHER PUBLICATIONS

Abstract of Soviet Document SU 752 566 in the name of Lenningrad Lensovet Tech, entitled "Air Magnesium Cell", Jul. 1980.

*Primary Examiner*—Anthony Skapars
*Attorney, Agent, or Firm*—Jones & Askew

[57] ABSTRACT

The present invention provides a system for venting gas from within a case housing a metal-air cell having a cathode and an anode with a separator positioned therebetween. The cell has at least one gas vent on the anode side of the separator that extends from the interior surface of the case to the exterior surface. Each gas vent has a gas vent cap thereon on the interior surface of the case. A gas permeable, hydrophobic membrane is positioned between each gas vent and gas vent cap. The gas vent, with the gas vent cap positioned thereon, prevents the anode from blocking the venting of gas through the membrane.

65 Claims, 5 Drawing Sheets

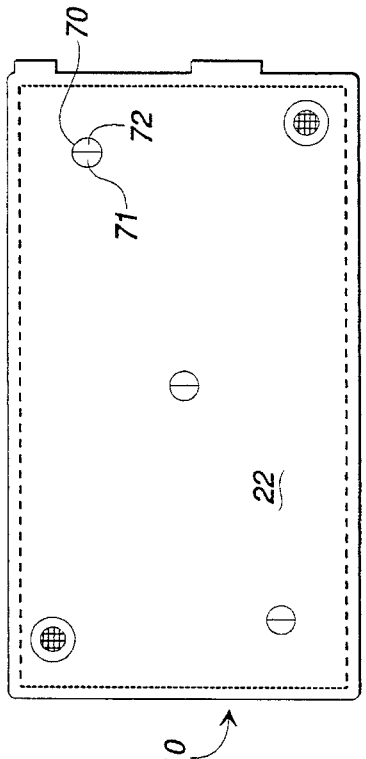
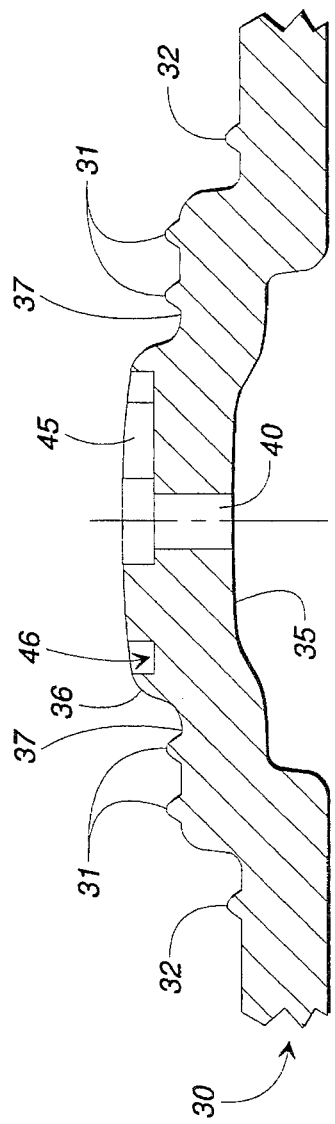
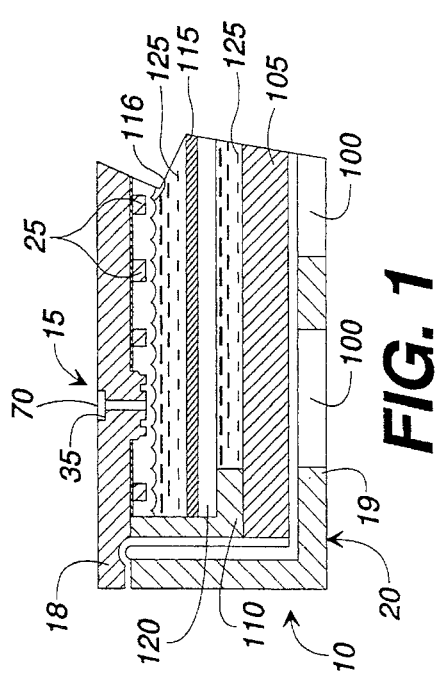
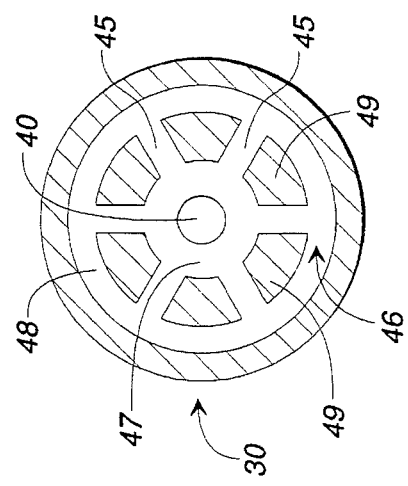

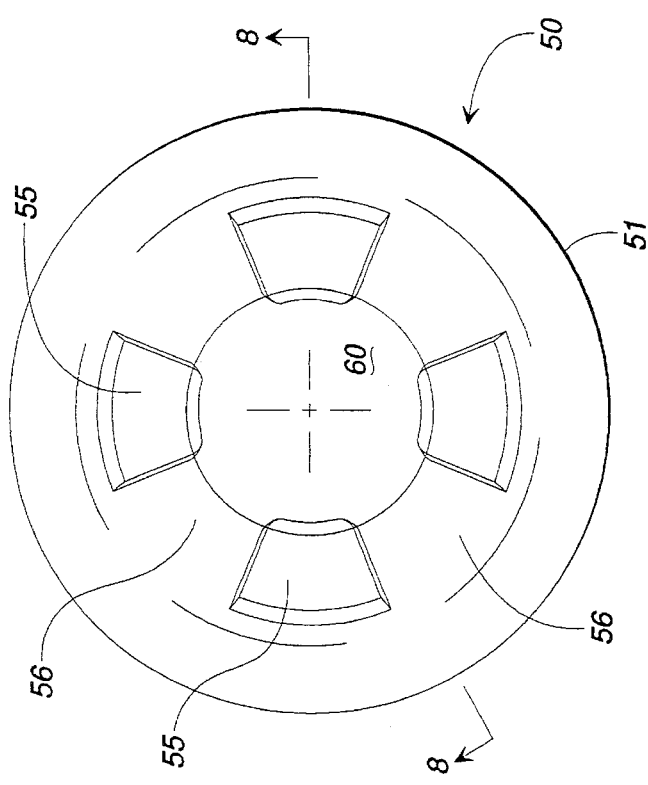
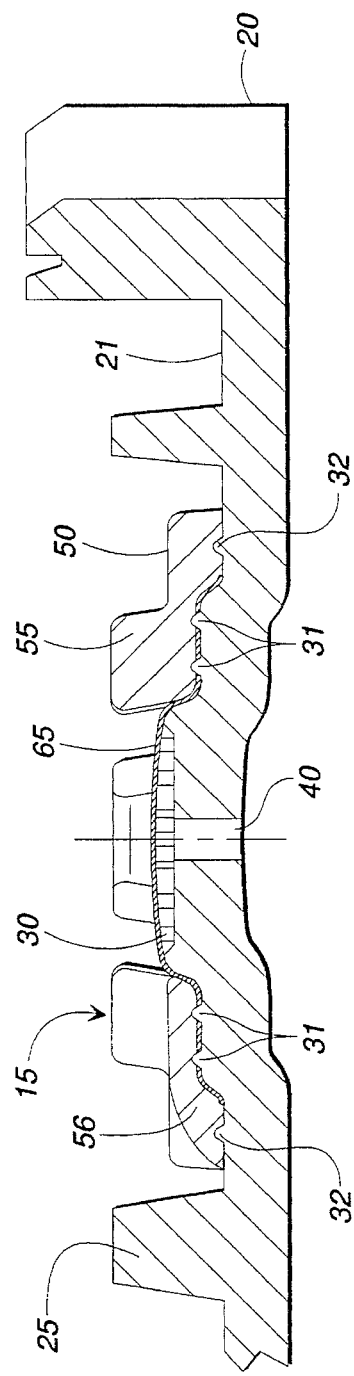
FIG. 7
FIG. 8

DIFFUSION VENT FOR A RECHARGEABLE METAL-AIR CELL

TECHNICAL FIELD

This invention relates generally to metal-air cells and, more particularly, to vent systems for the exhaust of gasses generated within a metal-air cell.

BACKGROUND OF THE INVENTION

During the operation of an electrochemical cell, such as a metal-air cell, gasses are released during the electrochemical reaction. These gasses must be vented from the interior of the case housing of the cell or cell operation and efficiency may be compromised. It is also desirable to prevent the passage of liquids into or out of the cell and to prevent the intrusion of contaminates while the internal gasses are being vented from the cell.

Metal-air cells include an air-permeable cathode and a metallic anode separated by an aqueous electrolyte. During the operation of a cell such as a zinc-air cell, oxygen from ambient air is converted at the cathode to hydroxide ions, zinc is oxidized at the anode and reacts with these hydroxide ions such that water and electrons are released to provide electrical energy. Various gasses are released within the cell structure during this electrochemical reaction causing the internal pressure in the cell case to increase with continued use. Because the cathode is usually not capable of supporting high hydrostatic pressures (typically less than 2 psi), the gasses generated within the cell case must be vented at low pressures to protect the cathode.

While venting internal gasses is possible through mechanical devices that can open and close to the atmosphere, these devices must reseal each time after venting. The hermeticity of the case may be sacrificed by the opening and closing a mechanical seal. The control of electrolyte leakage and equilibrium vapor pressure also may be difficult depending upon the size of the opening as well as the length of time in which the mechanical seal is open. Environmental contaminants, such as carbon dioxide, also may enter through the opening. Further, the relative humidity of the ambient air that enters the cell through the opening is also of concern. If the relative humidity of the ambient air is too high, then the battery may fail due to a condition called flooding. However, if the relative humidity of the ambient air is too low, then the battery may fail due to drying out.

Known methods for venting gasses generated from within a cell include that described in commonly owned U.S. Pat. No. 5,362,577, issued Nov. 8, 1994, entitled "Diffusion Vent for a Rechargeable Metal-Air Cell," disclosing a vent system providing at least one gas exit hole that is sufficiently small to prevent electrolyte leakage and also to prevent the intake of excess carbon dioxide or excess water vapor from the atmosphere. The disclosure of U.S. Pat. No. 5,362,577 is incorporated herein by reference. Generally, this invention also discloses the use of combinations of gas permeable, hydrophobic membranes, such as polypropylene, and diffuser materials, such as polyethylene, to cover the gas exit hole. A recess also may be provided within the case such that the gas exit hole communicates between the atmosphere and the recess. A gas collection area is defined by the recess formed in the case wall or by the gas diffuser membrane attached to the case.

In a preferred embodiment of the invention described in U.S. Pat. No. 5,362,577, the case has at least one recess defined on its interior surface. The recess extends towards the exterior of the case so as to define a gas collection area, with at least one gas exit hole communicating with the atmosphere. The gas exit hole has a smaller cross-sectional area than the cross-sectional area of the recess. The gas exit hole is covered with a gas permeable, hydrophobic membrane. A gas diffuser is retained or attached within the recess. A second gas permeable, hydrophobic membrane is then attached to the interior surface of the case and covers the gas diffuser and first gas permeable, hydrophobic membrane. The gas diffuser both supports the inner membrane when under pressure and laterally diffuses the gas between the membranes. The membranes are ultrasonically welded to the case.

While the system of U.S. Pat. No. 5,362,577 provides superior venting of exhaust gas from a battery case while maintaining a hermetic seal, what is needed is a simplified venting system. This simplified system would provide venting for the case while eliminating the need for some of the materials and construction techniques currently used. It is also desirable for a vent system to prevent the ingress of gasses, such as oxygen, that may corrode the anode and otherwise impede the operation of the cell. Further, because the anode tends to expand during discharge, it is desirable to provide structural support for the cell to ensure that the anode does not block the vent. These additional goals must be accomplished while maintaining an adequate venting system and insuring the hermeticity of the cell.

SUMMARY OF THE INVENTION

Generally described, the present invention provides a system for venting gas from within a case housing a metal-air cell having a cathode and an anode with a separator positioned therebetween. The cell has at least one gas vent on the anode side of the separator that extends from the interior surface of the case to the exterior surface. Each gas vent has a gas vent cap thereon on the interior surface of the case. A gas permeable, hydrophobic membrane is positioned between each gas vent and gas vent cap. The gas vent, with the gas vent cap positioned thereon, prevents the anode from blocking the venting of gas through the membrane.

Specific embodiments include the use of Teflon as a gas membrane and polypropylene for the case, the gas vent, and the gas vent cap. The Teflon membrane is bonded to the polypropylene by pinching the membrane between the gas vent and the gas vent cap and ultrasonically welding the vent and the cap together. While Teflon and polypropylene are generally incompatible for joining, a type of adhesion between the materials is achieved. The use of Teflon as the membrane eliminates the need for the porous gas diffuser sheet as used in U.S. Pat. No. 5,362,577. The gas vent and the gas vent cap are dome shaped with several channels therein to permit the drainage of electrolyte. These chapels permit self draining when the cell is tilted or rotated. Further, the use of this dome shape provides mechanical support for the anode and anode collector to prevent the cell case from swelling and to prevent the anode from blocking the vents.

The present invention further adds a valve for pressure differential relief and to prevent the intrusion of gasses. Left unprotected, oxygen from the atmosphere can intrude into a diffusion vent and cause corrosion of the zinc anode. The invention solves this problem through the use of a burp valve or a flapper valve that seals out oxygen and other gasses but allows hydrogen to escape when internal pressure is created. The valve can be adjusted to vary the force or internal pressure required to open the valve.

It is thus an object of the present invention to provide a vent system that exhausts gasses generated within a battery case.

It is another object of the present invention to provide a vent system that exhausts gasses generated from within a battery case while maintaining the hermetic seal of the case.

It is a further object of the present invention to provide a vent system that exhausts gasses generated from within a battery case while preventing excess water loss or gain within the case.

It is a still further object of the present invention to provide a vent system that exhausts gasses generated from within a battery case while minimizing gas intake.

It is a still further object of the present invention to provide a gas vent for a battery cell with self draining channels therein for orientation independence of cell.

It is a still further object of the present invention to provide for the use of Teflon as a gas permeable, hydrophobic membrane within a polypropylene battery cell case.

It is a still further object of the present invention to provide a gas vent in a battery cell case that provides structural support to a cell.

It is a still further object of the present invention to provide an adequate gas collection area near the gas vent for efficient diffusion through the membrane.

It is a still further object of the present invention to provide a pressure relief valve for a battery cell.

It is a still further object of the invention to provide a venting system for a battery cell that prevents the ingress of oxygen and other gasses into the cell.

Other objects, features, and advantages of the present invention will become apparent upon review of the following detailed description of the preferred embodiments of the invention, when taken in conjunction with the drawing and the claims.

BRIEF DESCRIPTION OF THE DRAWINGS

FIG. 1 is a side cross-sectional view of a metal-air cell showing the preferred embodiment of the vent system.

FIG. 4 shows a plan view of the gas exit hole of the gas vent surrounded by the plateaus.

FIG. 5 is a magnified cross-sectional view of a gas vent with the gas exit hole and the ribs.

FIG. 7 is a plan view of the gas vent cap with several tabs extending therefrom.

FIG. 8 is a side cross-sectional view of the interior surface of cell case showing the gas vent with the cap and gas membrane in place, taken along line 8—8 of FIG. 7.

FIG. 11 is a plan view of the exterior surface of the cell case.

DETAILED DESCRIPTION OF THE INVENTION

Figure 2:
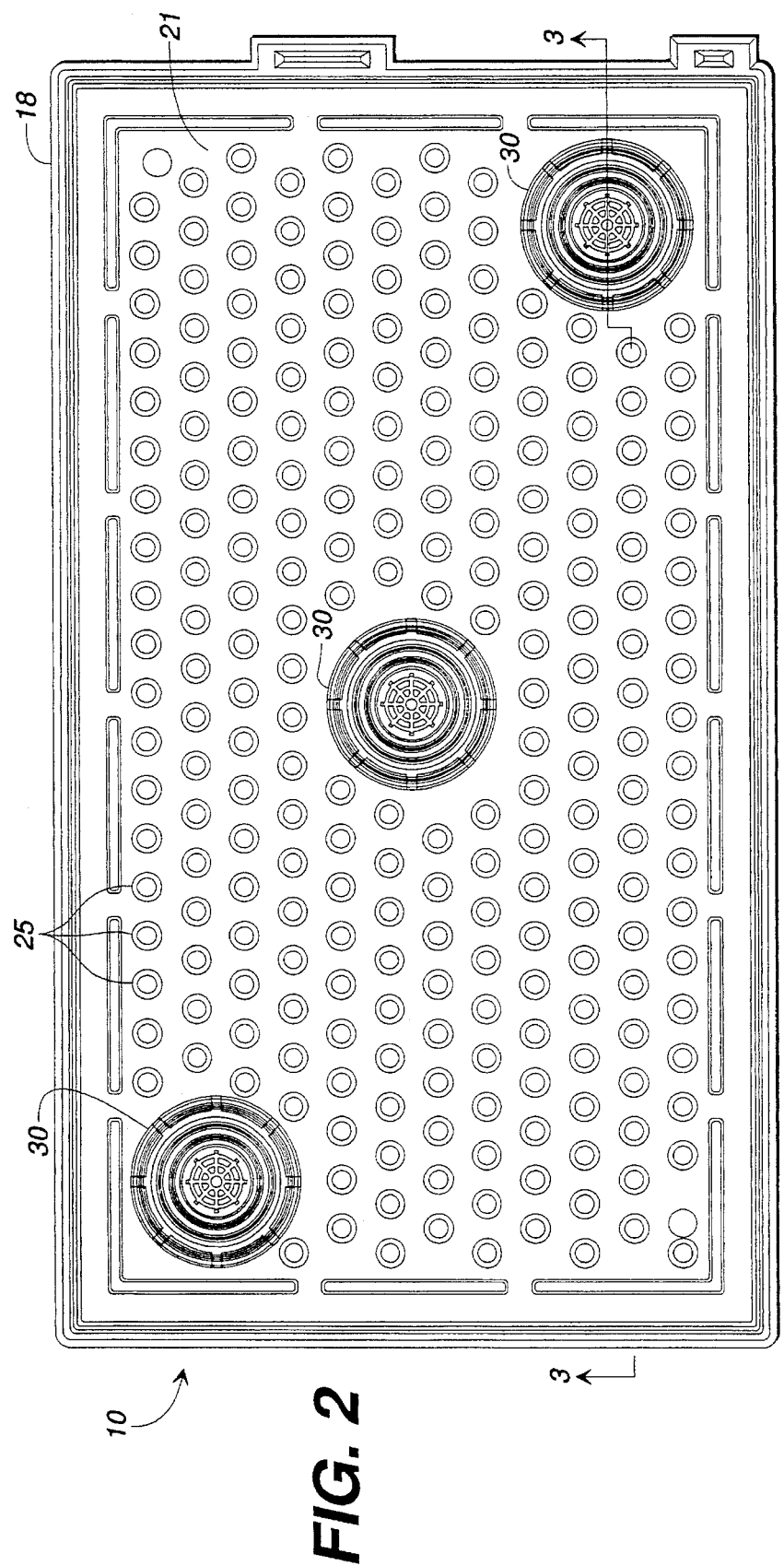
FIG. 2 is a plan view of the interior surface of the cell case showing the gas vent of an alternative embodiment.

Referring to the drawings, in which like numerals represent like parts throughout the several views, FIGS. 1–8 show the preferred embodiment of one or more vent systems 15 positioned in a cell case 20 of a metal-air cell 10. The vent systems 15 provide for exhausting excess gasses generated within the cell case 20 during operation of the cell 10 to prevent the build-up of pressure therein. Each vent system 15 includes a gas vent 30, a gas vent cap 50, and a gas membrane 65.

FIG. 1 is a side cross-sectional view of a metal-air cell 10 showing the preferred embodiment of the vent system 15 in the cell 10. One or more vent systems 15 are formed in a top wall 18 of the cell case 20. The vent systems 15 are located over and provide support for an anode 115 and an anode screen 116. The anode screen 116 also may be covered by an electrolyte reservoir pad (not shown) to keep the anode screen 116 moist.

In a bottom wall 19, the cell case 20 includes a plurality of openings 100. An air cathode 105 is disposed within the cell case 20 such that the openings 100 expose the cathode 105 to the atmosphere. A cathode support 110 secures the cathode 105 in position as well as containing and supporting the anode 115, an absorbent separator material 120, and an electrolyte 125. The electrolyte 125 partially fills the cell case 20 thereby defining a liquid volume within the cell case 20. The remaining non-solid volume contains a gas, such as hydrogen, that is generated when the cell 10 is recharged.

FIG. 2 is a plan view of an interior surface 21 of the top wall 18 of the cell case 20 on the anode 115 side of the cell 10. The interior surface 21 of the cell case 20 contains a plurality of gas vents 30 arranged at spaced intervals. The gas vents 30 are molded into the wall 18 of the cell case 20. The gas vents 30 are positioned to ensure that at least one gas vent 30 may communicate with the gas volume within the cell case 20. The cell case 20 may be oriented through at least a 90 degree vertical rotation from the horizontal position and at least one vent 30 will be above the maximum level of the electrolyte 125 of the cell case 20. Preferably, the vents 30 are aligned in a diagonal array as shown in FIG. 2, but also may be positioned near the edges or corners of the cell case 20. It should be appreciated that the number of vents 30 and the position of the vents 30 may vary depending upon the amount of electrolyte 125 used within the cell case 20 and depending upon the shape and contents of the cell case 20. Also, the number of vents 30 may vary according to the cross-sectional area of the vents 15.

Figure 3:
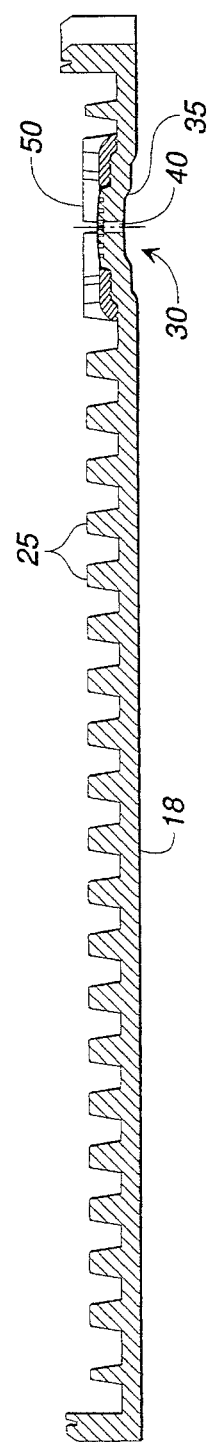
FIG. 3 is a side cross-sectional view of the cell case showing a row of the pegs and a gas vent of one of the vent systems, taken along line 3—3 of FIG. 2.

The interior surface 21 of the cell case wall 18 also contains a plurality of support posts or pegs 25 arranged at uniformly spaced intervals, as is shown in FIGS. 2 and 3. The pegs 25 provide structural support for the anode 115 and the anode screen 116 while providing an area for gasses generated within the cell 10 to collect. The pegs 25 are approximately 0.120 inches in height from the interior surface 21 of the cell case 20.

The cell case 20 itself is generally made from polypropylene. The cell case 20 of this embodiment is approximately 4.86 inches in length and approximately 2.56 inches in width. One or more cells 10 may be stacked together to form a battery pack (not shown).

Figure 6:
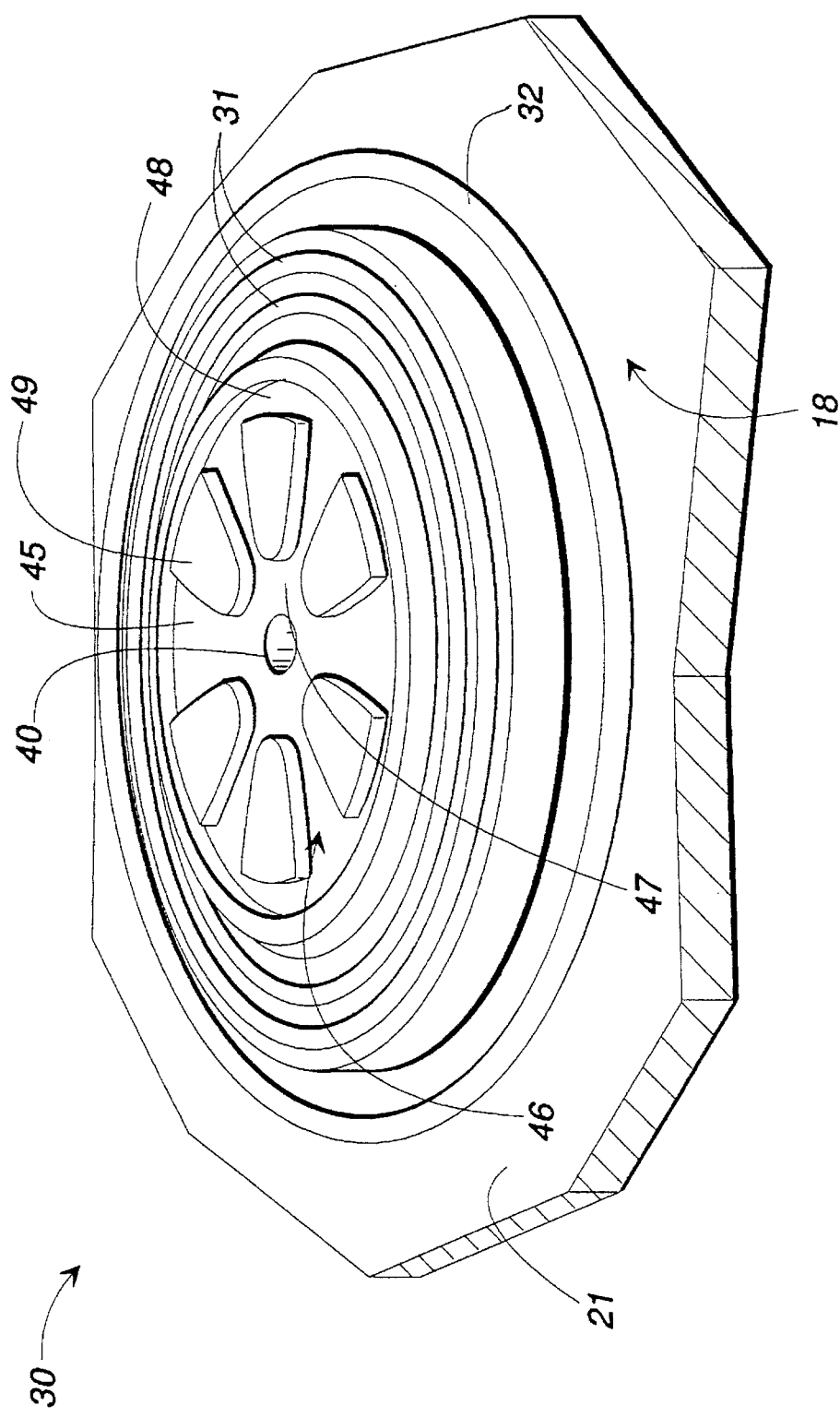
FIG. 6 is a perspective view of the gas vent.

The gas vents 30 are placed approximately 1.9 inches away from each other along the length of the cell case 20 and approximately 0.8 inches away from each other along the width of the cell case 20, along a diagonal line as shown. The gas vents are dome-like in shape. A central dome 36 is surrounded by an annular plateau 37. The central dome 36 is encircled by a series of ribs 31 of approximately 0.012 inches in height, positioned on the annular plateau 37. The ribs 31 are best shown in FIGS. 2, 5, and 6. The dome-like shape of the gas vent 30 is shown in FIG. 3, which is a side cross-sectional view of the cell case 20, and in FIG. 6 which is a perspective view of the gas vent 30. The gas vent 30 is approximately 0.10 inches in height from the interior surface 21 of the cell case 20. The dome-like shape of the gas vent 30 also creates a recess 35 on the exterior surface 22 of the cell case 20. The recess 35 is approximately 0.41 inches in diameter.

A gas exit hole 40 is located in the center of the gas vent 30. The gas exit hole 40 is approximately 0.045 inches in diameter. The gas exit hole 40 extends from the recess 35 on the exterior surface 22 to the interior surface 21 of the cell case 20. On the interior surface 21 of the cell case 20, the gas exit hole 40 extends into a gas collection area 46 and a central depression 47. The gas collection area 46 is formed as a series of gas channels 45 extending outward in spoke-like fashion from the central depression 47 to an outer circular channel 48. The channels are defined by a group of roughly triangular plateaus 49 surrounding the central depression 47 with the gas exit hole 40 positioned in its center. The channels 45 are approximately 0.025 inches wide. FIG. 4 shows a top plan view of the gas exit hole 40 surrounded by the gas collection area 46 and the plateaus 49.

FIG. 7 is a top plan view of the gas vent cap 50 with several tabs 55 extending therefrom. The cap 50 includes an annular ring 51 with, in this embodiment, four tabs 55 protruding upwards and away from the interior surface 21 of the cell case 20. The tabs 55 are evenly spaced on the ring 51 and define between them four radial cap channels 56. The ring 51 further defines a central opening 60 in its interior that is surrounded by the tabs 55. As is shown in FIG. 8, the cap 50 is designed to fit matingly with the vent 30 such that the central dome 36 defining the gas collection area 46 and the plateaus 49 are positioned in the central opening 60. When the cap 50 is installed on the vent 30, the plateaus 49 are slightly elevated above the radial cap channels 56. This slight elevation of the plateaus 49 over the cap channels 56 ensures that electrolyte 125 drains away from the vent system 15. The cap 55 is constructed from polypropylene.

FIG. 8 is a side cross-sectional view of the top cell wall 18 of cell case 20 showing the gas vent 30 with the cap 50 and the gas membrane 65 in place, taken along line 8—8 of FIG. 7. The gas membrane 65 is positioned between the gas vent 30 and the gas vent cap 50 such that the gas exit hole 40 and the channels 45 of the gas collection area 46 are completely sealed. The gas membrane 65 is made from gas permeable polytetrafluouroethylene ("PTFE" or "Teflon"). While Teflon and polypropylene are generally not compatible for joining, a type of adhesion is achieved between the materials by the use of ultrasonic welding and a pinch backup. The membrane 65 is stretched over the dome-shaped gas vent 30 and is supported by the plateaus 49 of the gas collection area 46. The membrane 65 is pinched between the ribs 31 of the gas vent 30 and the cap 50. The cap 50 is then ultrasonically welded to the gas vent 30 along an outer annular rib 32 to ensure a hermetic seal. Other welding techniques or adhesives may also be used. When the cap 50 and the gas membrane 65 are in place over the gas vent 30, the height of the vent system 15 from the interior surface 21 of the cell case 20 is approximately 0.120 inches, or the same height as the pegs 25.

The gas membrane 65 is hydrophobic and gas permeable. The membrane 65 allows gas to be vented from the cell 10 but is substantially impermeable to water. The membrane 65 therefore prevents liquid loss or intrusion from or into the cell. The properties of Teflon membranes are well known to those skilled in the art.

Figure 9:
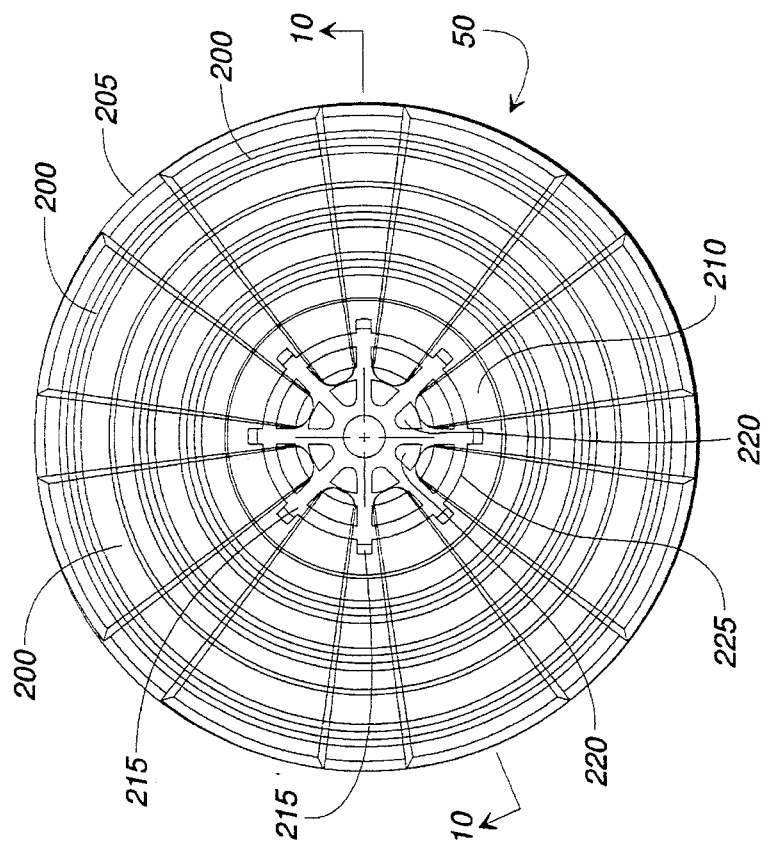
FIG. 9 is a plan view of an alternative gas vent cap with several tabs extending therefrom.
Figure 10:
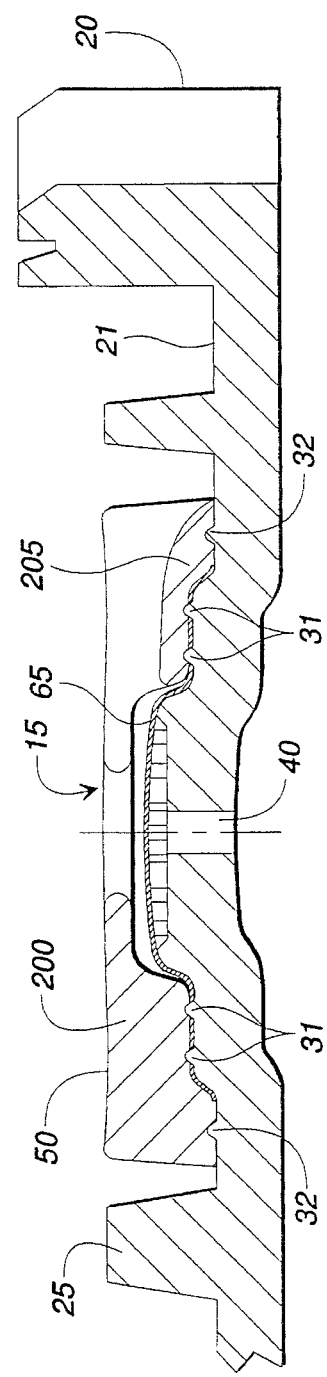
FIG. 10 is a side cross-sectional view of the interior surface of cell case showing the gas vent with the alternative cap and gas membrane in place, taken along line 10—10 of FIG. 9.

FIGS. 9–10 show an alternative embodiment of the present invention. This alternative embodiment is similar to that described above, but has distinctly shaped tabs 55 positioned on the ring 56 of the gas cap 50 and has an increased number of gas channels 45 positioned in the gas collection area 46 of the gas vent 30. As is shown in FIG. 9, this embodiment has eight cantilevered tabs 200 for increased structural support for the anode 115. These cantilevered tabs 200 extend the width of the ring 205 and cantilever over the central opening 210. FIG. 9 also shows an alternative embodiment of the gas vent 30 with eight gas channels 215 and plateaus 220. Further, the gas channels 215 extend outward through two sets of circular outer channels 225. This embodiment of the gas vent 30 provides for a more diffuse gas collection area 230. This embodiment of the gas vent 30 is also shown in plan view in FIG. 2. While the number of the plateaus 220 and the tabs 200 are even in this alternative embodiment, there is no requirement that they be equal. The number of tabs 200 is determined by the amount of structural support needed for the anode 115.

FIG. 11 is a plan view of the exterior surface 22 of the cell case 20. A pressure relief valve or "burp valve" 70 is mounted over each gas exit hole 40 and recess 35. The burp valve 70 prevents oxygen and other gasses from entering the cell 10 via the vent systems 15 while still allowing hydrogen gas to escape. The burp valve 70 uses a circular piece of thin, flexible plastic material that deforms under pressure but resiliently returns to its original shape and position in the absence of such pressure. A thin slit 71 is positioned in the center of the burp valve 70. The periphery 72 of the burp valve 70 is secured to the exterior surface 22 of the cell case 20 such that the burp valve 70 completely surrounds the recess 35. The periphery 72 of the burp valve 70 is secured to the cell case 20 by means of ultrasonic welding, adhesives, or other bonding means. Other embodiments of the burp valve 70 include the use of a flapper valve (not shown) having a strip of the thin flexible plastic material that is secured on one end to the cell case 20.

In use, hydrogen gas generated at the anode 115 of the cell 10 collects within the interior surface 21 of the cell case 20 in the area between the pegs 25 and the vent systems 15. The gas membrane 65 in each vent system 15 permits the hydrogen gas to pass into the channels 45 of the gas collection area 46 and to escape through the gas exit hole 40. The gas membrane 65 allows hydrogen gas to be exhausted but substantially prevents water vapor from exiting or entering the cell 10 such that hermeticity of the cell 10 is maintained. The vent systems 15 are positioned such that at least one vent system 15 is free to communicate with the gas volume.

The gas vent 30 in each vent system 15 is dome-like in shape to provide additional structural strength to the cell case 20 and to provide the gas collection area 46. The gas collection area 46 is defined by a series of plateaus 49 encircling the gas exit hole 40. The plateaus 49 ensure that the gas membrane 65 is raised over the gas exit hole 40 and the gas collection area 46 to provide a sufficient surface area for the diffusion of gasses through the membrane 65. The gas cap 50 with the tabs thereon also provides structural support to the cell case 20.

This structural support and the gas collection area provided by the gas vent system 15 are desired because the anode 115 tends to expand during discharge of the cell 10. This expansion may block the gas exit hole 40 and can create a "wet blanket" effect that prevents the vent system 15 from operating. The pegs 25 and the gas vent systems 15 provide structural support to the cell case 20 to resist the expansion of the anode 115. More tabs 55 can be added to the gas cap 50 depending upon the amount of support needed to keep the anode 115 away from the membrane 65.

Efficiency of the cell 10 is also increased by ensuring proper draining of electrolyte 125 away from the vent system 15. Each of the gas caps 50 has a series of radial draining channels 56 to ensure that electrolyte 125 drains away from the vent 30 when the cell 10 is moved or rotated, rather than collecting on the vent 30 and preventing the exhaust of hydrogen.

Each vent system 15 may also have a pressure release valve or burp valve 70 on the exterior surface 22 of the cell casing 20. The burp valve 70 provides for the release of internal pressure and prevents the intrusion of gasses from the atmosphere. In its undeformed position, the burp valve 70 seals the vent system 15 to prevent gasses from entering the cell 10. When hydrogen is generated by the cell 10, the internal pressure causes the thin strip of flexible material to expand such that the slit 71 opens to the atmosphere and allows the hydrogen to escape. Upon the release of the hydrogen, the pressure in the cell 10 returns to normal and the burp valve 70 reseals over the gas exit hole 40. Similarly, in the flapper valve embodiment, the escaping hydrogen gas forces the unattached end of the flapper valve to extend away from the exterior surface 22 of the cell case 20, thereby permitting the gas to escape. Upon the release of the hydrogen, the pressure in the cell 10 returns to normal and the flapper valve reseals over the gas exit hole 40.

The burp valve 70 likewise prevents the ingress of gasses from the atmosphere. This feature is particularly helpful if a group of cells 10 is stacked into a battery pack (not shown). Oxygen and other gasses can corrode the anode 115 and compromise the operation and efficiency of the cell 10 if they are allowed to intrude into the cell casing 20. Further, the byproducts of the corrosion process also can clog the membrane 65.

The ingress of gasses is a concern particularly during recharge of the cell 10. The zinc anode 115 has a lesser volume then the zinc and zinc oxide present during discharge of the cell 10. This reduced volume causes somewhat of a vacuum effect in the interior of the cell case 20. Ambient air and carbon dioxide tend to enter the cell case 20 and cause discharge of the anode 115. More pressure is required to permit the ingress of gasses, however, if the surface area of the burp valve 70 on the side of the recess 35 is smaller than the surface area facing the atmosphere. In this design, the burp valve 70 therefore effectively prevents the ingress of gasses into the cell 10. Further, the size of the recess 35 can be changed so as to vary the amount of pressure required to penetrate the burp valve 70.

In sum, the vent system 15 of the present invention has the novel ability to maintain the hermetic seal of the cell case 20 so that contaminates do not enter the cell 10 and so that electrolyte 125 is retained within the cell 10 during the exhaustion of excess hydrogen gas. The invention also provides structural support to the cell to resist expansion of the anode 115. The invention further permits the release of internal pressure while preventing the intrusion of oxygen and other gasses into the cell case 20 such that corrosion or undesired discharge of the zinc anode 115 is eliminated or greatly delayed. The invention as a whole provides three stages of relief: (1) liquid/gas separation, (2) pressure differential relief, (3) prevention of gas intrusion. These advantages are obtained through the use of fewer materials and simplified construction techniques as compared to the prior art. These advantages are accomplished in the preferred embodiment through the novel joining of Teflon and polypropylene by ultrasonic welding with a pinch back up to achieve a hermetic seal.

The foregoing relates only to the preferred embodiments of the present invention, and many changes may be made therein without departing from the scope of the invention as defined by the following claims.

I claim:

1. A system for venting gas from within a case housing a metal-air cell having a cathode and an anode with a separator position therebetween, said case having an interior surface and an exterior surface, comprising:

at least one gas vent in said case on the anode side of said separator;

said gas vent extending from said interior surface of said case to said exterior surface of said case;

a gas vent cap covering each one of the said gas vents on said interior surface of said case; and a gas permeable, hydrophobic membrane positioned between each pair of said gas vents and said gas vent caps;

said gas vent cap being configured to prevent said anode from blocking the venting of gas through said membrane.

2. The apparatus of claim 1 wherein said gas vent cap has at least one draining channel therein extending from said gas vent to said interior surface of said case.

3. The apparatus of claim 1 wherein said case, said gas vent, and said gas vent cap comprise polypropylene.

4. The apparatus of claim 1 wherein said gas permeable, hydrophobic membrane comprises polytetrafluouroethylene ("PTFE").

5. The apparatus of claim 1 wherein gas vent defines a plurality of gas collection channels in communication with said membrane.

6. The apparatus of claim 5 wherein said gas collection channels are defined by a series of plateaus supporting said membrane.

7. The apparatus of claim 1 wherein said gas vent is dome-like in shape.

8. The apparatus of claim 1 wherein said gas vent cap comprises an annular ring and a plurality of tabs protruding therefrom into said cell.

9. The apparatus of claim 1 further comprising support pegs positioned on said interior surface on said anode side of said case.

10. The apparatus of claim 1 wherein said gas permeable, hydrophobic membrane is held in place by pinching said membrane between said gas vent and said gas vent cap.

11. The apparatus of claim 10 wherein said gas vent is encircled by a plurality of ribs that assist in pinching said gas permeable, hydrophobic membrane between said gas vent and said gas vent cap.

12. The apparatus of claim 1 wherein said gas vent and said gas vent cap are joined via ultrasonic welding.

13. The apparatus of claim 1 further comprising a valve positioned on the exterior surface of said case over each of said gas vents.

14. The apparatus of claim 13 wherein said valve provides pressure relief for said cell and prevents gas intrusion into said cell.

15. The apparatus of claim 13 wherein said valve comprises a strip of thin material with a slit therein that deforms while under pressure.

16. A system for venting gas from within a polypropylene case housing a metal-air cell having a cathode and an anode with a separator position therebetween, said case having an interior surface and an exterior surface, comprising:

at least one gas vent in said case on the anode side of said separator;

said gas vent extending from said interior surface of said case to said exterior surface of said case;

a gas vent cap covering each one of the said gas vents on said interior surface of said case; and a polytetrafluouroethylene ("PTFE") membrane positioned between each pair of said gas vents and said gas vent cap;

said PTFE membrane held in place by pinching said membrane between said gas vent and said gas vent cap.

17. The apparatus of claim 16 wherein said gas vent cap has at least one draining channel therein extending from said gas vent to said interior surface of said case.

18. The apparatus of claim 16 wherein said gas vent cap is configured to prevent said anode from blocking the venting of gas through said membrane.

19. The apparatus of claim 16 wherein gas vent defines a plurality of gas collection channels in communication with said membrane.

20. The apparatus of claim 16 wherein said gas vent is dome-like in shape.

21. The apparatus of claim 16 further comprising support pegs positioned on said interior surface on said anode side of said case.

22. The apparatus of claim 16 wherein said gas vent cap comprises an annular ring and a plurality of tabs protruding therefrom into said cell.

23. The apparatus of claim 16 wherein said gas vent is encircled by a plurality of ribs that assist in pinching said gas permeable, hydrophobic membrane between said gas vent and said gas vent cap.

24. The apparatus of claim 16 wherein said gas vent and said gas vent cap are joined via ultrasonic welding.

25. The apparatus of claim 16 further comprising a valve positioned on the exterior surface of said case over each of said gas vents.

26. The apparatus of claim 25 wherein said valve provides pressure relief for said cell and prevents gas intrusion into said cell.

27. The apparatus of claim 25 wherein said valve comprises a strip of thin material with a slit therein that deforms while under pressure.

28. A system for venting gas from within a polypropylene case housing a metal-air cell having a cathode and an anode with a separator position therebetween, said case having an interior surface and an exterior surface, comprising:

at least one gas vent in said case on the anode side of said separator;

said gas vent extending from said interior surface of said case to said exterior surface of said case;

a gas vent cap covering each one of the said gas vents on said interior surface of said case;

said gas vent cap having at least one draining channel therein extending from said gas vent to said interior surface of said case; and a polytetrafluouroethylene ("PTFE") membrane positioned between each pair of said gas vents and said gas vent caps.

29. The apparatus of claim 28 wherein gas vent defines a plurality of gas collection channels in communication with said membrane.

30. The apparatus of claim 28 wherein said gas vent cap is configured to prevent said anode from blocking the venting of gas through said membrane.

31. The apparatus of claim 28 wherein said gas vent is dome-like in shape.

32. The apparatus of claim 28 further comprising support pegs positioned on said interior surface on said anode side of said case.

33. The apparatus of claim 28 wherein said gas vent cap comprises an annular ring and a plurality of tabs protruding therefrom into said cell.

34. The apparatus of claim 28 wherein said gas permeable, hydrophobic membrane is held in place by pinching said membrane between said gas vent and said gas vent cap.

35. The apparatus of claim 34 wherein said gas vent is encircled by a plurality of ribs that assist in pinching said gas permeable, hydrophobic membrane between said gas vent and said gas vent cap.

36. The apparatus of claim 28 wherein said gas vent and said gas vent cap are joined via ultrasonic welding.

37. The apparatus of claim 28 further comprising a valve positioned on the exterior surface of said case over each of said gas vents.

38. The apparatus of claim 37 wherein said valve provides pressure relief for said cell and prevents gas intrusion into said cell.

39. The apparatus of claim 37 wherein said valve comprises a strip of thin material with a slit therein that deforms while under pressure.

40. A system for venting gas from within a case housing a metal-air cell having a cathode and an anode with a separator position therebetween, said case having an interior surface and an exterior surface, comprising:

at least one gas vent in said case on the anode side of said separator;

said gas vent extending from said interior surface of said case to said exterior surface of said case;

a gas vent cap covering each one of the said gas vents on said interior surface of said case;

a gas permeable, hydrophobic membrane positioned between each pair of said gas vents and said gas vent caps; and a plurality of support pegs positioned on said interior surface on said anode side of said case;

said support pegs and said gas vents with said gas caps positioned thereon defining a gas collection area on said interior surface of said case.

41. The apparatus of claim 40 wherein said gas vent cap has at least one draining channel therein extending from said gas vent to said interior surface of said case.

42. The apparatus of claim 40 wherein said case, said gas vent, and said gas vent cap comprise polypropylene.

43. The apparatus of claim 40 wherein said gas permeable, hydrophobic membrane comprises polytetrafluouroethylene ("PTFE").

44. The apparatus of claim 40 wherein said gas vent defines a plurality of gas collection channels in communication with said membrane.

45. The apparatus of claim 40 wherein said gas vent cap is configured to prevent said anode from blocking the venting of gas through said membrane.

46. The apparatus of claim 40 wherein said gas vent cap comprises an annular ring and a plurality of tabs protruding therefrom into said cell.

47. The apparatus of claim 40 wherein said gas permeable, hydrophobic membrane is held in place by pinching said membrane between said gas vent and said gas vent cap.

48. The apparatus of claim 47 wherein said gas vent is encircled by a plurality of ribs that assist in pinching said gas permeable, hydrophobic membrane between said gas vent and said gas vent cap.

49. The apparatus of claim 40 wherein said gas vent and said gas vent cap are joined via ultrasonic welding.

50. The apparatus of claim 40 further comprising a valve positioned on the exterior surface of said case over each of said gas vents.

51. The apparatus of claim 50 wherein said valve provides pressure relief for said cell and prevents gas intrusion into said cell.

52. The apparatus of claim 50 wherein said valve comprises a strip of thin material with a slit therein that deforms while under pressure.

53. A system for venting gas from within a case housing a metal-air cell having a cathode and an anode with a separator position therebetween, said case having an interior surface and an exterior surface, comprising:

- at least one gas vent in said case on the anode side of said separator;
- said gas vent extending from said interior surface of said case to said exterior surface of said case;
- a gas vent cap covering each one of the said gas vents on said interior surface of said case;
- a gas permeable, hydrophobic membrane positioned between each pair of said gas vents and said gas vent caps; and
- a strip of thin material with a slit therein that deforms while under pressure positioned on the exterior surface of said case over each of said gas vents.

54. The apparatus of claim 53 wherein said case, said gas vent, and said gas vent cap comprise polypropylene.

55. The apparatus of claim 53 wherein said gas permeable, hydrophobic membrane comprises polytetrafluouroethylene ("PTFE").

56. The apparatus of claim 53 wherein said gas vent cap has at least one draining channel therein on said interior surface of said case.

57. The apparatus of claim 53 wherein said gas vent cap is configured to prevent said anode from blocking the venting of gas through said membrane.

58. The apparatus of claim 53 wherein said gas vent is dome-like in shape.

59. The apparatus of claim 53 further comprising support pegs positioned on said interior surface on said anode side of said case.

60. The apparatus of claim 53 wherein said gas vent cap comprises an annular ring and a plurality of tabs protruding therefrom into said cell.

61. The apparatus of claim 53 wherein said gas permeable, hydrophobic membrane is held in place by pinching said membrane between said gas vent and said gas vent cap.

62. The apparatus of claim 61 wherein said gas vent is encircled by a plurality of ribs that assist in pinching said gas permeable, hydrophobic membrane between said gas vent and said gas vent cap.

63. The apparatus of claim 53 wherein said gas vent and said gas vent cap are joined via ultrasonic welding.

64. The apparatus of claim 53 wherein said strip of thin material with a slit therein that deforms while under pressure provides pressure relief for said cell and prevents gas intrusion into said cell.

65. The apparatus of claim 53 wherein said gas vent defines a plurality of gas collection channels in communication with said membrane.

* * * * *